(12) United States Patent
Campbell et al.

(10) Patent No.: US 7,653,677 B1
(45) Date of Patent: Jan. 26, 2010

(54) DIGITAL LOGIC CIRCUIT FOR ADDING THREE BINARY WORDS AND METHOD OF IMPLEMENTING SAME

(75) Inventors: Scott J. Campbell, Frederick, CO (US);
Brian D. Philofsky, Longmont, CO (US); Lyman D. Lewis, Hudson, NH (US)

(73) Assignee: XILINX, Inc., San Jose, CA (US)

( * ) Notice: Subject to any disclaimer, the term of this patent is extended or adjusted under 35 U.S.C. 154(b) by 862 days.

(21) Appl. No.: 11/044,744

(22) Filed: Jan. 26, 2005

(51) Int. Cl.
*G06F 7/50* (2006.01)
(52) U.S. Cl. ..................................................... 708/709
(58) Field of Classification Search .......... 708/700–714
See application file for complete search history.

(56) References Cited

U.S. PATENT DOCUMENTS

| | | | | |
|---|---|---|---|---|
| 4,592,008 A | * | 5/1986 | Nopper | 708/703 |
| 5,047,976 A | * | 9/1991 | Goto et al. | 708/714 |
| 5,349,250 A | * | 9/1994 | New | 708/703 |
| 5,546,018 A | * | 8/1996 | New et al. | 326/38 |
| 5,787,492 A | * | 7/1998 | Shuma et al. | 708/708 |
| 5,898,319 A | * | 4/1999 | New | 326/41 |
| 5,944,777 A | * | 8/1999 | Kumar et al. | 708/713 |
| 6,584,485 B1 | * | 6/2003 | Aoki et al. | 708/708 |
| 6,598,066 B1 | * | 7/2003 | Ott | 708/710 |
| 6,782,406 B2 | * | 8/2004 | Koshy | 708/710 |
| 6,990,508 B1 | * | 1/2006 | Mohammed et al. | 708/700 |
| 7,386,583 B2 | * | 6/2008 | Cho | 708/700 |
| 2004/0267862 A1 | * | 12/2004 | Rarick | 708/710 |
| 2004/0267863 A1 | * | 12/2004 | Bhushan et al. | 708/710 |
| 2005/0055395 A1 | * | 3/2005 | Nakaya | 708/700 |

OTHER PUBLICATIONS

Xilinx, Inc.; "Virtex-II Platform FPGA Handbook"; published Dec. 2000; pp. 33-75, available from Xilinx, Inc., 2100 Logic Drive, San Jose, California 95124.

\* cited by examiner

*Primary Examiner*—Chat C Do
(74) *Attorney, Agent, or Firm*—Robert M. Brush; Thomas George

(57) ABSTRACT

A digital logic circuit includes at least one stage. Each stage includes sum logic, combinatorial logic, and carry chain logic. The sum logic is configured to generate a first sum signal from a first set of three input signals. The combinatorial logic includes a carry generation portion and a sum generation portion. The carry generation portion is configured to generate a first carry signal from a second set of three input signals. The sum generation portion is configured to generate a second sum signal from the first sum signal and the first carry signal. The carry chain logic is configured to process the first sum signal, the second sum signal, and a carry-in signal to generate a carry-out signal and a third sum signal.

18 Claims, 6 Drawing Sheets

DIGITAL LOGIC CIRCUIT FOR ADDING THREE BINARY WORDS AND METHOD OF IMPLEMENTING SAME

FIELD OF THE INVENTION

One or more aspects of the present invention relate generally to digital logic circuits and, more particularly, to a digital logic circuit for adding three binary words and a method of implementing the same.

BACKGROUND OF THE INVENTION

Programmable logic devices (PLDs) are a well-known type of integrated circuit that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAMs), multipliers, digital signal processing blocks (DSPs), processors, clock managers, delay lock loops (DLLs), and the like.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and the like.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

FPGAs typically include arithmetic logic for performing various arithmetic operations (e.g., addition, subtraction, multiplication, and the like). In many high-speed applications, more than two data words must be added together in one clock cycle. For example, summing three data words is a common operation in digital signal processing (DSP) and networking applications. Currently, FPGAs exist that include "carry chain logic" optimized for adding two data words. With such FPGAs, two separate carry chains must be used to implement a three word adder.

In particular, FIG. 1 is a block diagram depicting a conventional three-word adder 100 implemented using two separate carry chains 102 and 104. In the present example, the three-word adder 100 sums 4-bit data words X, Y, and Z. As used herein, for a given data word M, the notation M[n] refers to the nth bit of M. The carry chain 102 comprises adders $106_1$ through $106_4$ (collectively referred to as adders 106), and the carry chain 104 comprises adders $108_1$ through $108_4$ (collectively referred to as adders 108). The adder $106_1$ computes the sum of the bits X[1] and Y[1] and a carry value. For each adder $106_k$ of the adders $106_1$ through $106_4$, the adder $106_k$ computes: (i) the sum of bits X[k], Y[k], and the carry value produced by the adder $106_{k-1}$; and (ii) a carry value. The adder $108_1$ computes the sum of the output of the adder $106_1$ and the bit Z[1]. For each adder $108_k$ of the adders $108_2$ through $108_4$, the adder $108_k$ computes: (i) the sum of the output of the adder $106_k$, the bit Z[k], and a carry value produced by the adder $108_{k-1}$; and (ii) a carry value.

In the conventional three-word adder 100, the critical path (for example, bold dashed line path for Y[1] in FIG. 1) for each bit traverses two add operations (e.g., the adder $106_1$ and the adder $108_1$) prior to entering the carry chain of the final adder (e.g., the carry C[1] produced by the adder $108_1$). In other words, for each bit, the critical data path traverses the carry chain of two adders. For each bit, the delay through the two adders combined with the routing delay between the two adders comprises a significant portion of the total adder delay and creates a significant performance penalty.

A "carry-save adder" is known that reduces the delays associated with the conventional three-word adder 100. The carry-save adder separates the three word add operation into a two word add operation. Notably, the carry-save adder pre-computes the sum and carry values of the three words, and then adds the sum and carry bits together using a two-word add operation.

FIG. 2 is a block diagram depicting an nth stage 200 of a conventional carry-save adder for the kth bit location of three input words X, Y, and Z. The kth stage 200 includes an exclusive-OR (XOR) gate 202, AND gates 204, 206, and 208, an OR gate 214, an XOR gate 210, and an AND gate 212. The XOR gate 202 produces a pre-computed sum bit from the bits X[k], Y[k], and Z[k]. The AND gates 204, 206, and 208 in combination with the OR gate 214 produce a pre-computed carry bit from the bits X[k−1], Y[k−1], and Z[k−1] (i.e., the carry value from the k−1st bit location). The XOR gate 210 and the AND gate 212 comprise a full adder 209. The AND gate 212 produces a carry value for the kth bit location, C[k], from the pre-computed sum bit and the pre-computed carry bit. The XOR gate 210 produces a sum value, S[k], from the pre-computed carry bit, the pre-computed sum bit, and a carry value, C[k−1] from the k−1st stage.

A conventional carry-save adder may be formed by replicating the stage 200 for any number of bit locations. Due to the additional logic required to pre-compute the sum and carry values, the carry-save adder requires more logic resources to implement than the traditional dual carry-chain solution of FIG. 1. In an FPGA, this additional logic not only reduces the device resources available for other logic, but also reduces the performance gain of the carry-save adder by increasing routing congestion and delay between elements.

Accordingly, there exists a need in the art for an improved digital logic circuit for adding three binary words.

SUMMARY OF THE INVENTION

A digital logic circuit for adding three binary words and a method of implementing the same is described. In one embodiment, a digital logic circuit includes at least one stage. Each stage includes sum logic, combinatorial logic, and carry chain logic. The sum logic is configured to generate a first sum signal from a first set of three input signals. The combinatorial logic includes a carry generation portion and a sum generation portion. The carry generation portion is configured to generate a first carry signal from a second set of three input signals. The sum generation portion is configured to generate a second sum signal from the first sum signal and the first carry signal. The carry chain logic is configured to process the first sum signal, the second sum signal, and a carry-in signal to generate a carry-out signal and a third sum signal.

In another embodiment, a programmable logic device includes programmable logic configured to provide at least one stage. For each stage, the programmable logic includes a first function generator, a second function generator, and carry chain logic. The first function generator is configured to generate a first sum signal from a first set of three input signals. The second function generator is configured to generate a first carry signal from a second set of three input signals and a second sum signal from the first sum signal and the first carry signal. The carry chain logic is configured to process the first sum signal, the second sum signal, and a carry-in signal to generate a carry-out signal and a third sum signal.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

A digital logic circuit for adding three binary words and a method of implementing the same is described. According to one aspect of the invention, a digital logic circuit is provided for adding three binary data words with reduced signal delay and reduced logic resources. One or more aspects of the invention are described with respect to a field programmable gate array (FPGA). Exemplary embodiments of an FPGA and a logic block "slice" are described immediately below with respect to FIGS. 3 and 4. Those skilled in the art will appreciate, however, that the invention may be employed in other types of programmable logic devices (PLDs), such as complex programmable logic devices (CPLDs).

Figure 3:
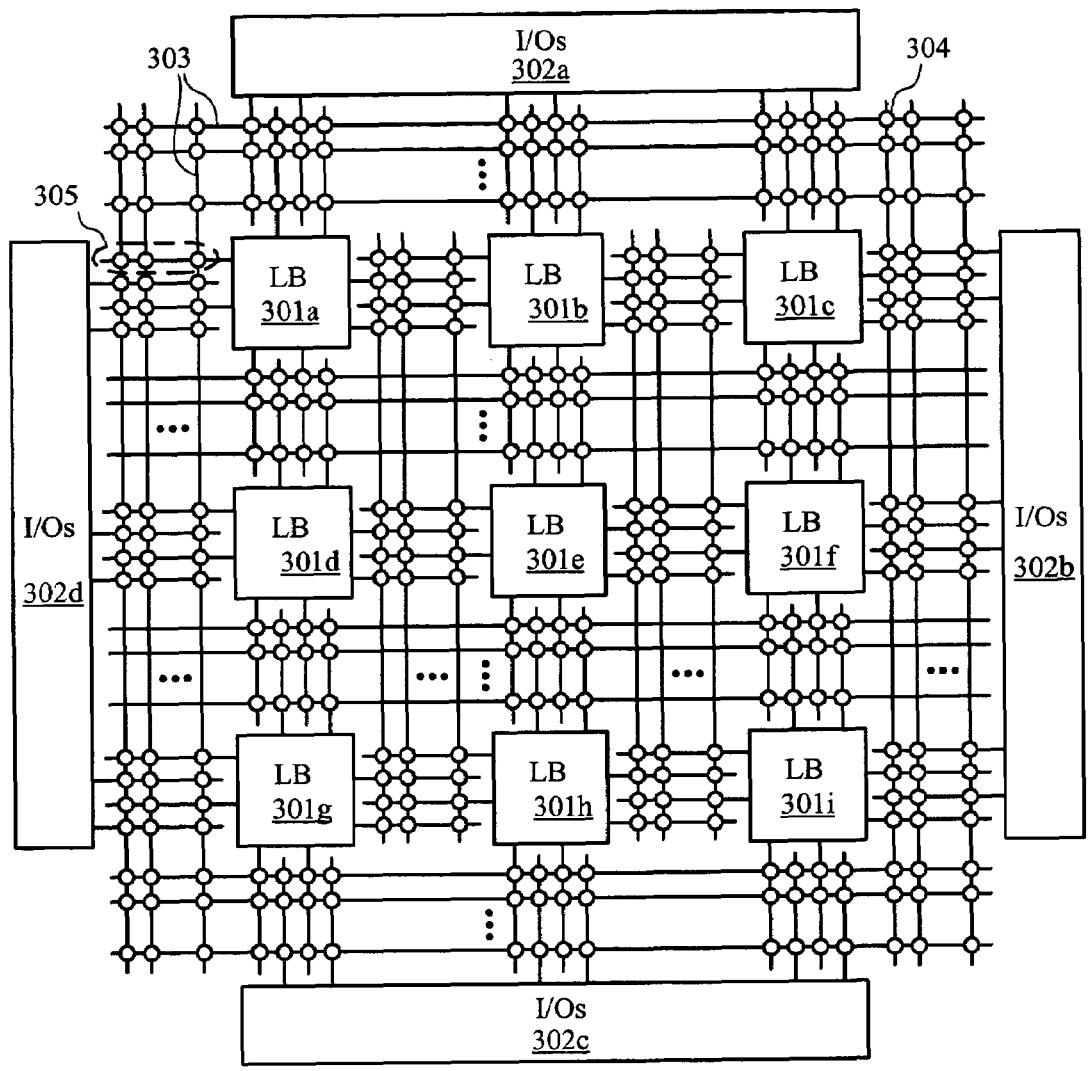
FIG. 3 is a block diagram depicting an exemplary embodiment of an FPGA in which the present invention may be employed.

FIG. 3 is a block diagram depicting an exemplary embodiment of an FPGA 300 in which the present invention may be employed. The FPGA 300 includes an array of configurable logic blocks (LBs 301a-301i, collectively LBs 301) and programmable input/output blocks (I/O blocks 302a-302d, collectively I/O blocks 302). The LBs 301 and the I/O blocks 302 are interconnected by a programmable interconnect structure that includes a large number of interconnect lines 303 interconnected by programmable interconnect points (PIPS 304, shown as small circles). Some of the PIPs 304 are often coupled into groups (e.g., group 305) that implement multiplexer circuits selecting one of several interconnect lines to provide a signal to a destination interconnect line or logic block. Some FPGAs also include additional logic blocks with special purposes (not shown), e.g., delay locked loops (DLLs), random access memory (RAM), and the like.

As is well known in the art, the LBs 301, I/O blocks 302, and the programmable interconnect structure may be configured to perform a variety of functions. Some or all of the LBs 301 may include one or more "slices" and programmable interconnect circuitry. An exemplary embodiment of a slice is shown below with respect to FIG. 4. In general, each LB slice includes various circuits, such as flip-flops, function generators (e.g., a look-up tables (LUTs)), logic gates, memory, and like type well-known circuits. The LBs 301, I/O blocks 302, and the programmable interconnect structure are typically programmed by loading a stream of configuration data into internal configuration memory cells (not shown) that define how the programmable elements are configured. The configuration process of the FPGA 300 is also well known in the art. One such FPGA that may be used with the invention, the Xilinx Virtex®-II FPGA, is described in detail in pages 33-75 of the "Virtex-II Platform FPGA Handbook", published December, 2000, available from Xilinx, Inc., 2100 Logic Drive, San Jose, Calif. 95124, which pages are incorporated herein by reference.

Figure 4:
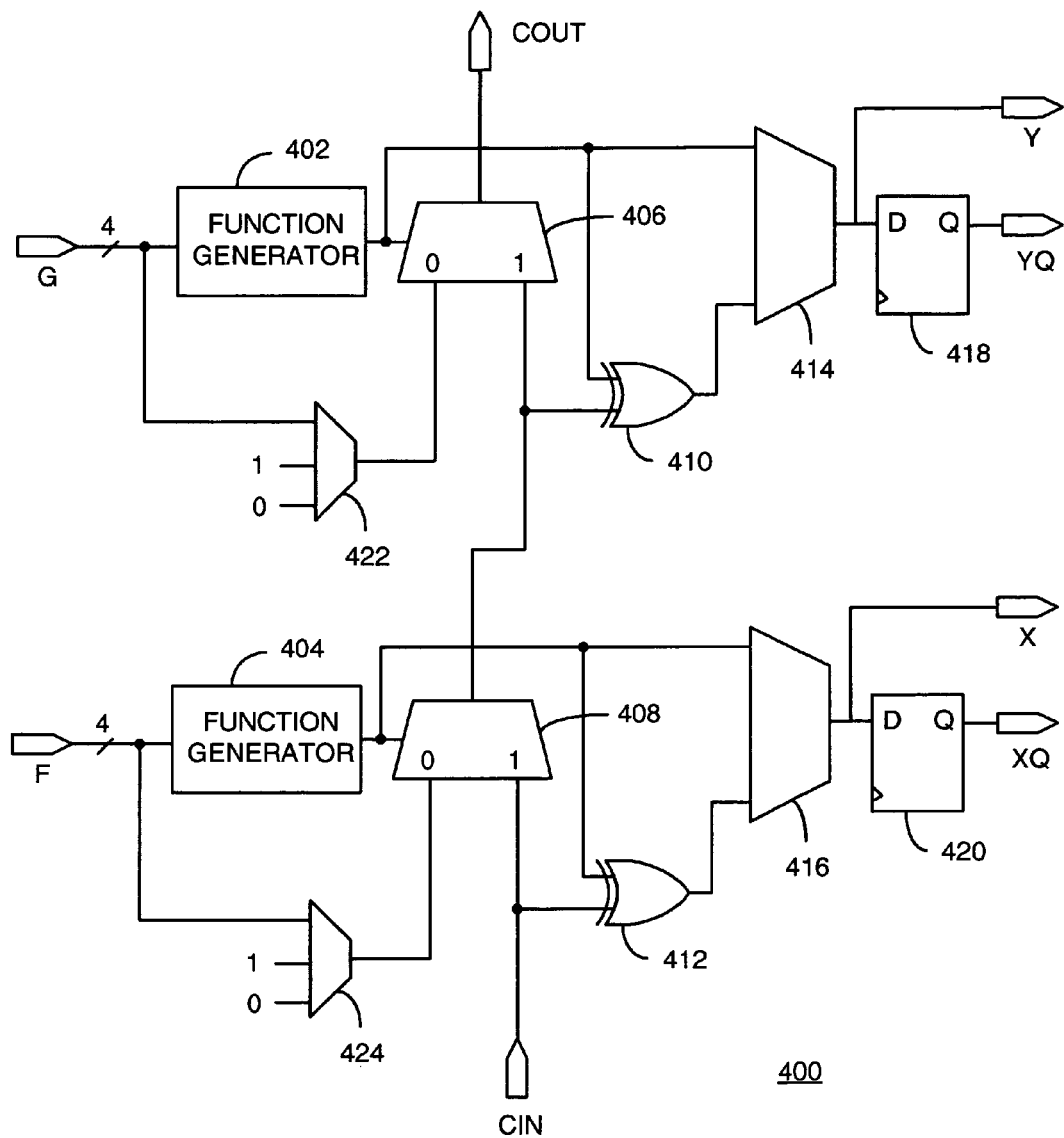
FIG. 4 is a simplified block diagram depicting an exemplary embodiment of a logic block slice.

FIG. 4 is a simplified block diagram depicting an exemplary embodiment of a logic block slice 400. The slice 400 includes two function generators 402 and 404, two carry multiplexers 406 and 408, two exclusive OR (XOR) gates 410 and 412, two multiplexers 414 and 416, and two memory elements 418 and 420 (e.g., D-type flip-flops). Each of the function generators 402 and 404 may comprise a LUT. Each of the function generators 402 and 404 may be configured to provide an output signal that is an arbitrary Boolean function of its input signals.

The function generator 402 includes four data input terminals G1 through G4 (collectively referred to as G inputs), and provides an output signal to a select terminal of the carry multiplexer 406, an input terminal of the XOR gate 410, and an input terminal of the multiplexer 414. The XOR gate 410 provides an output signal to another input terminal of the multiplexer 414. The multiplexer 414 selects among input signals from the function generator 402 and the XOR gate 410, and provides an output signal to an output terminal Y and to an input terminal of the memory element 418. The memory element 418 provides an output signal to the output terminal YQ. The functionality of the function generator 402 and the multiplexer 414 may be defined by the configuration data for the FPGA.

Similarly, the function generator 404 includes four data input terminals F1 through F4 (collectively referred to as F inputs), and provides an output signal to a select terminal of the carry multiplexer 408, an input terminal of the XOR gate 412, and an input terminal of the multiplexer 416. The XOR gate 412 provides an output signal to another input terminal of the multiplexer 416. The multiplexer 416 selects among input signals from the function generator 404 and the XOR gate 410, and provides an output signal to an output terminal X and to an input terminal of the memory element 420. The memory element 420 provides an output signal to the output terminal YQ. The functionality of the function generator 404 and the multiplexer 416 may be defined by the configuration data for the FPGA.

The carry multiplexers 406 and 408 form a carry chain from a carry-in terminal CIN to a carry-out terminal COUT. Notably, the multiplexer 424 selects among a high signal ("1"), a low signal ("0"), and m of the four data input signals F1 through F4 (e.g., F1 and F2), and provides an output signal to an input terminal of the carry multiplexer 408. The CIN terminal is coupled to another input of the carry multiplexer 408, and another input of the XOR gate 412. The carry multiplexer 408 selects between an output signal of the multiplexer 424 and the CIN terminal under control of the output signal from the function generator 404. The carry multiplexer 408 provides an output signal to an input terminal of the carry multiplexer 406 and another input terminal of the XOR gate 410. The functionality of the multiplexer 424 may be defined by the configuration data for the FPGA.

The multiplexer 422 selects among a high signal, a low signal, and m of the four data input signals G1 through G4 (e.g., G1 and G2), and provides an output signal to another input terminal of the carry multiplexer 406. The carry multiplexer 406 selects between an output signal of the multiplexer 422 and the output signal of the carry multiplexer 408. The carry multiplexer 406 provides an output signal to the COUT terminal. The functionality of the multiplexer 422 may be defined by the configuration data for the FPGA. Those skilled in the art will appreciate that an LB slice may include various other logic gates, multiplexers, and memory elements, in addition to those shown in FIG. 4. Another exemplary LB slice for a Virtex®-II FPGA is shown and described in the "Virtex-II Platform FPGA Handbook," referenced above.

The three-word adder of the invention may be implemented using LB slices of an FPGA. A digital logic circuit for adding three binary words is described immediately below with respect to FIGS. 5 and 6. An implementation of the digital logic circuit using LB slices is described thereafter.

Figure 5:
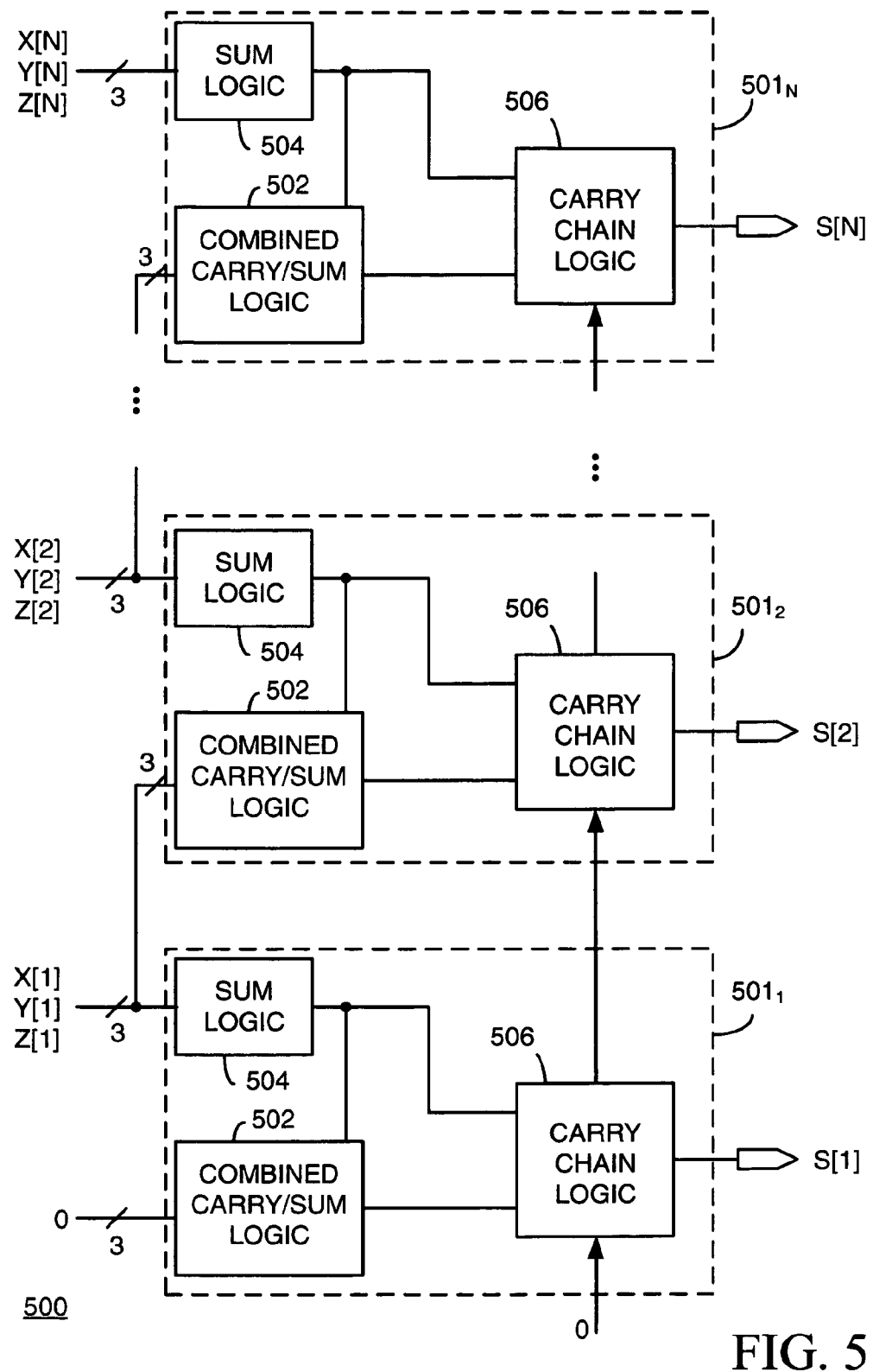
FIG. 5 is a block diagram depicting an exemplary embodiment of a three-word adder constructed in accordance with the invention.

FIG. 5 is a block diagram depicting an exemplary embodiment of a three-word adder 500 constructed in accordance with the invention. The adder 500 is configured to compute the binary sum, S, of three N-bit words X, Y, and Z, where N is greater than one. The adder 500 includes N stages $501_1$ through $501_N$ (collectively referred to as stages 501). Each of the stages 501 includes combined carry/sum logic 502, sum logic 504, and carry chain logic 506. In each stage $501_k$ of the stages 501, input terminals of the sum logic 504 are configured to receive data bits X[k], Y[k], and Z[k], where k is an integer. The term "bit" is used herein synonymously with the term "signal" (e.g., the data bit X[k] or the data signal X[k]). The sum logic 504 determines the binary sum of X[k], Y[k], and Z[k] for each stage $501_k$ irrespective of the carry value produced by such binary sum (e.g., 1+1=0). The sum logic 504 provides a sum bit to an input terminal of the carry chain logic 506 and an input terminal of the combined carry/sum logic 502.

In the first stage $501_1$, three input terminals of the combined carry/sum logic 502 are configured to receive a low signal (e.g., logic 0). In each stage $501_k$, where $2 \leq k \leq N$, three input terminals of the combined carry/sum logic 502 are configured to receive data bits X[k−1], Y[k−1], and Z[k−1]. In one embodiment, for each of the stages 501, the combined carry/sum logic 502 comprises combinatorial logic having a sum generation portion and a carry generation portion. In each stage $501_k$, where $2 \leq k \leq N$, the carry generation portion of the carry/sum logic 502 determines a carry value from the data bits X[k−1], Y[k−1], and Z[k−1] (i.e., the carry value from the sum computed in the previous less significant stage). In the stage $501_1$, the carry generation portion receives low signals, since there is not a previous less significant stage from which a carry could be computed, and thus no previous carry value. In each of the stages 501, the sum generation portion of the combined carry/sum logic 502 determines the binary sum of the sum bit from the sum logic 504 and the carry value determined by the carry generation portion of the combined carry/sum logic 502, irrespective of a carry value produced by such a sum. The combined carry/sum logic 502 provides an intermediate sum bit to the carry chain logic 506.

In each stage $501_k$ of the stages 501, the carry chain logic 506 processes the sum bit from the sum logic 504, the intermediate sum bit from the combined carry/sum logic 502, and a carry-in value to generate a carry-out value and the sum bit S[k]. Notably, the carry chain logic 506 computes the sum of the carry-in value and the intermediate sum bit to produce the sum bit S[k] and the carry-out value. The carry-in value for the stage $501_k$ is the carry-out value of the carry chain logic 506 of the previous less significant stage $501_{k-1}$. Note that the carry-in value for the carry chain logic 506 of the stage $501_1$ is a low signal, since there is no previous less significant stage.

Figure 6:
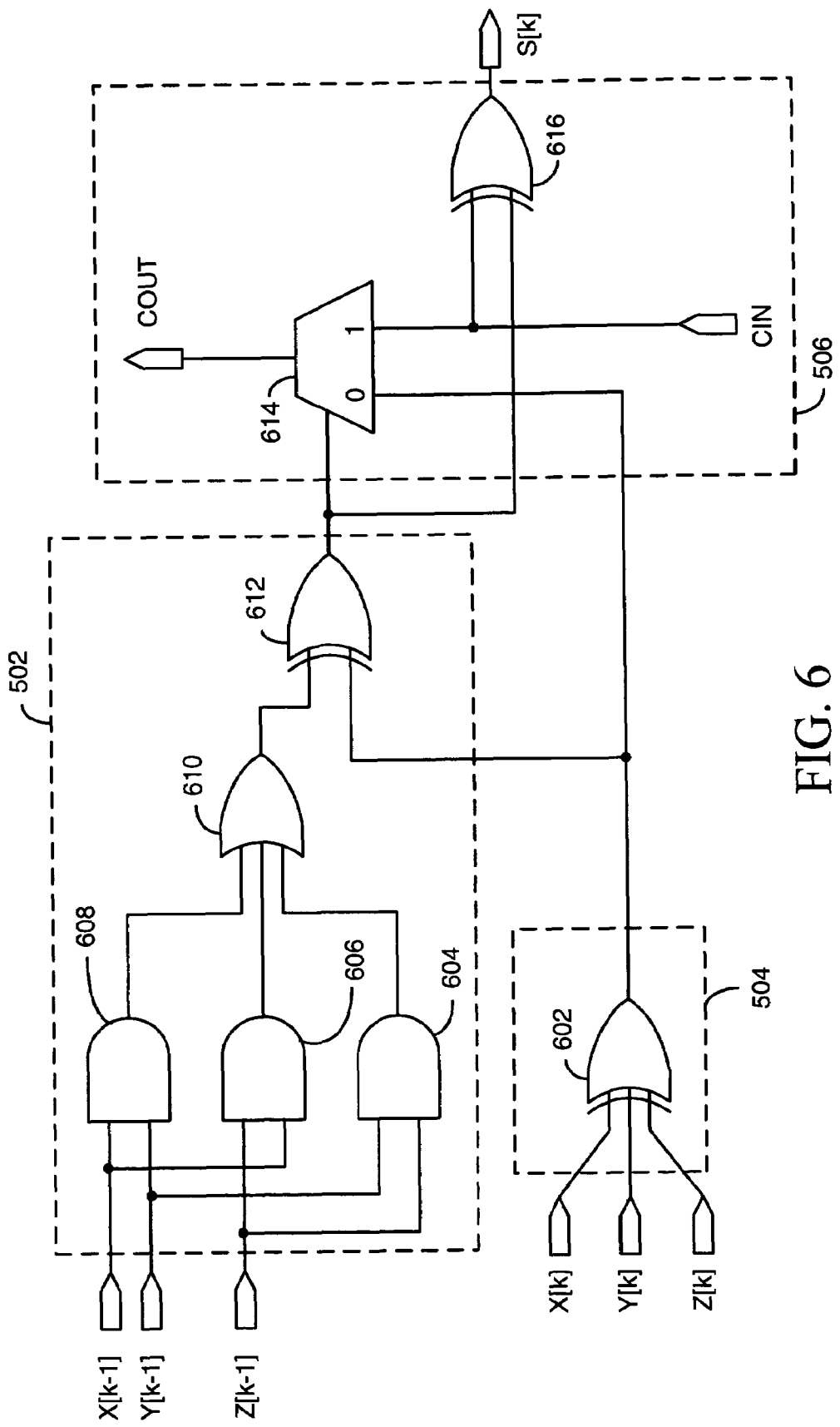
FIG. 6 is a block diagram depicting an exemplary embodiment of a stage of the adder shown in FIG. 5 constructed in accordance with the invention.

FIG. 6 is a block diagram depicting an exemplary embodiment of a stage $501_k$ of the adder 500 shown in FIG. 5 constructed in accordance with the invention. In the present embodiment, the sum logic 504 comprises an XOR gate 602. The carry generation portion of the combined carry/sum logic 502 comprises AND gates 604, 606, and 608, and an OR gate 610. The sum generation portion of the combined carry/sum logic 502 comprises an XOR gate 612. The carry chain logic 506 comprises a multiplexer 614 and an XOR gate 616.

The XOR gate 602 includes three input terminals configured to receive data bits X[k], Y[k], and Z[k], respectively. The XOR gate 602 is configured to provide an output signal to an input terminal of the XOR gate 612 and an input terminal of the multiplexer 614. Input terminals of the AND gate 608 are configured to receive data bits X[k−1] and Y[k−1], respectively. Input terminals of the AND gate 606 are configured to receive data bits X[k−1] and Z[k−1], respectively. Input terminals of the AND gate 604 are configured to receive data bits Y[k−1] and Z[k−1], respectively. Each of the AND gates 604, 606, and 608 is configured to provide an output signal to a respective input terminal of the OR gate 610. The OR gate 610 is configured to provide an output signal to another input terminal of the XOR gate 612. The XOR gate 612 is configured to provide an output signal to a select terminal of the multiplexer 614 and an input terminal of the XOR gate 616.

Another input port of the multiplexer 614 is configured to receive a carry-in (CIN) signal. The multiplexer 614 is configured to provide a carry-out (COUT) signal in accordance with the output signal of the XOR gate 612. The CIN signal is the COUT signal of the multiplexer 614 in the previous less signification (e.g., the stage $501_{k-1}$). Another input terminal of the XOR gate 616 is configured to receive the CIN signal. The XOR gate 612 is configured to provide an output sum signal S[k].

In operation, the output signal of the XOR gate 602 is the binary sum of the signals X[k], Y[k], and Z[k], irrespective of any carry value produced by such sum. If at least two of the signals X[k−1], Y[k−1], and Z[k−1] are high signals, than the AND gates 604, 606, and 608 will provide at least one high signal. Otherwise, each of the AND gates 604, 606, and 608 provides a low signal. Thus, the output signal of the OR gate is a high signal if and only if at least two of the input signals X[k−1], Y[k−1], and Z[k−1] are high signals. In other words, the OR gate 610 will produce a high signal if a carry is generated from the input signals X[k−1], Y[k−1], and Z[k−1] (i.e., the input signals are "110", "101", "011", or "111"). Conversely, the OR gate 610 will produce a low signal if a carry is not generated from the input signals X[k−1], Y[k−1], and Z[k−1] (i.e., the input signals are "100", "010", "001", or "000").

The output signal of the XOR gate 612 is the binary sum of the carry output signal of the OR gate 610 and the sum output signal of the XOR gate 602, irrespective of any carry value produced by such sum. If the output signal of the XOR gate 612 is a high signal, then the multiplexer 614 selects the CIN signal. That is, if the carry output signal of the OR gate 610 and the sum output signal of the XOR gate 602 are "01" or "10", then no carry is generated by their binary sum and the multiplexer 614 propagates the CIN signal as the COUT signal. If the output signal of the XOR gate 612 is a low signal, then the multiplexer 614 selects the sum output signal of the XOR gate 602. That is, if the carry output signal of the OR gate 610 and the sum output signal of the XOR gate 602 are "11", then a carry is generated by their binary sum and the multiplexer 614 selects the high sum signal from the XOR gate 602 as the COUT signal. If the carry output signal of the OR gate 610 and the sum output signal of the XOR gate 602 are "00", then a carry is not generated by their binary sum and the multiplexer 614 selects the low sum signal from the XOR gate 602 as the COUT signal. The output signal of the XOR gate 616 is then the binary sum of the CIN signal and the output signal of the XOR gate 612.

Table 1 illustrates the states of the XOR gate 602, the OR gate 610, the XOR gate 612, the CIN signal, the COUT signal, and the XOR gate 616 for each of six stages of a three-word adder of the invention with respect to the following addition operation:

TABLE 1

```
    0 0 1 1 1 1
    0 0 1 0 0 0
  + 0 0 1 1 1 0
  ─────────────
    1 0 0 1 0 1
```

| Stage | XOR 602 | OR 610 | XOR 612 | CIN | COUT | XOR 616 |
|---|---|---|---|---|---|---|
| 1 | 1 | 0 | 1 | 0 | 0 | 1 |
| 2 | 0 | 0 | 0 | 0 | 0 | 0 |
| 3 | 0 | 1 | 1 | 0 | 0 | 1 |
| 4 | 1 | 1 | 0 | 0 | 1 | 0 |
| 5 | 0 | 1 | 1 | 1 | 1 | 0 |
| 6 | 0 | 0 | 0 | 1 | 0 | 1 |

The three-word adder 500 of FIG. 5 may be implemented in an FPGA using LB slices configured as shown in FIG. 4. Notably, the sum logic 504 in each of the stages 501 may be implemented using a single four-input function generator of an LB slice. The combined carry/sum logic 502 in each of the stages 501 may be implemented using another single four-input function generator of an LB slice. The carry chain logic 506 in each of the stages 501 may be implemented using a carry multiplexer and XOR gate of an LB slice.

Figure 1:
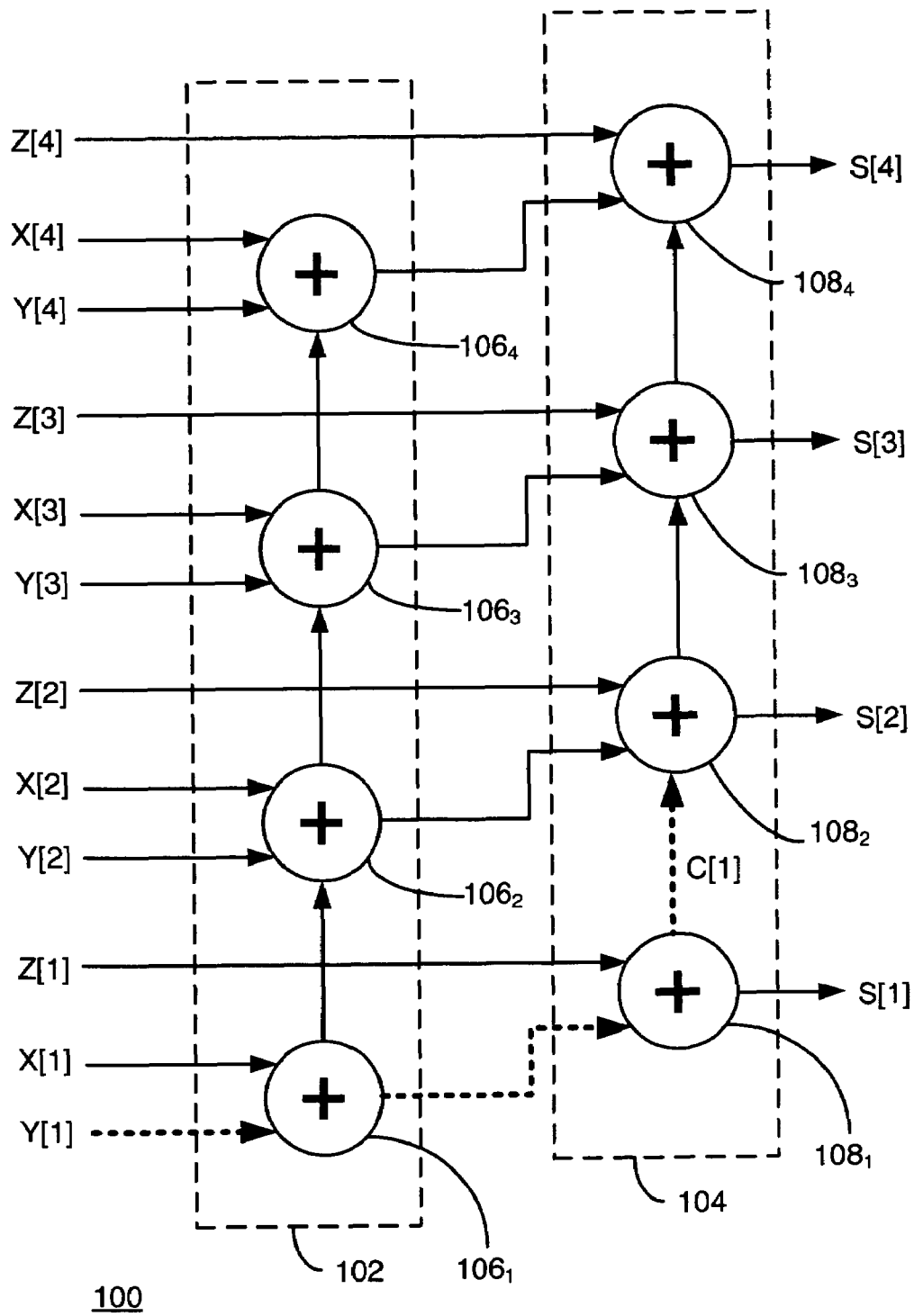
FIG. 1 is a block diagram depicting a conventional three-word adder implemented using two separate carry chains.

As is apparent from FIG. 6, the three-word adder of an embodiment of the present invention exhibits a critical path having less delay than does the conventional three-word adder implemented using two separate carry chains, as shown in FIG. 1. Notably, in this embodiment of the present invention, the first sum bit in a give stage is directly available from the sum generator 504, rather than being computed from a carry chain adder. This allows the adder of this embodiment of the invention to compute an addition operation in the same time as that of an identical size two-word carry chain adder.

Figure 2:
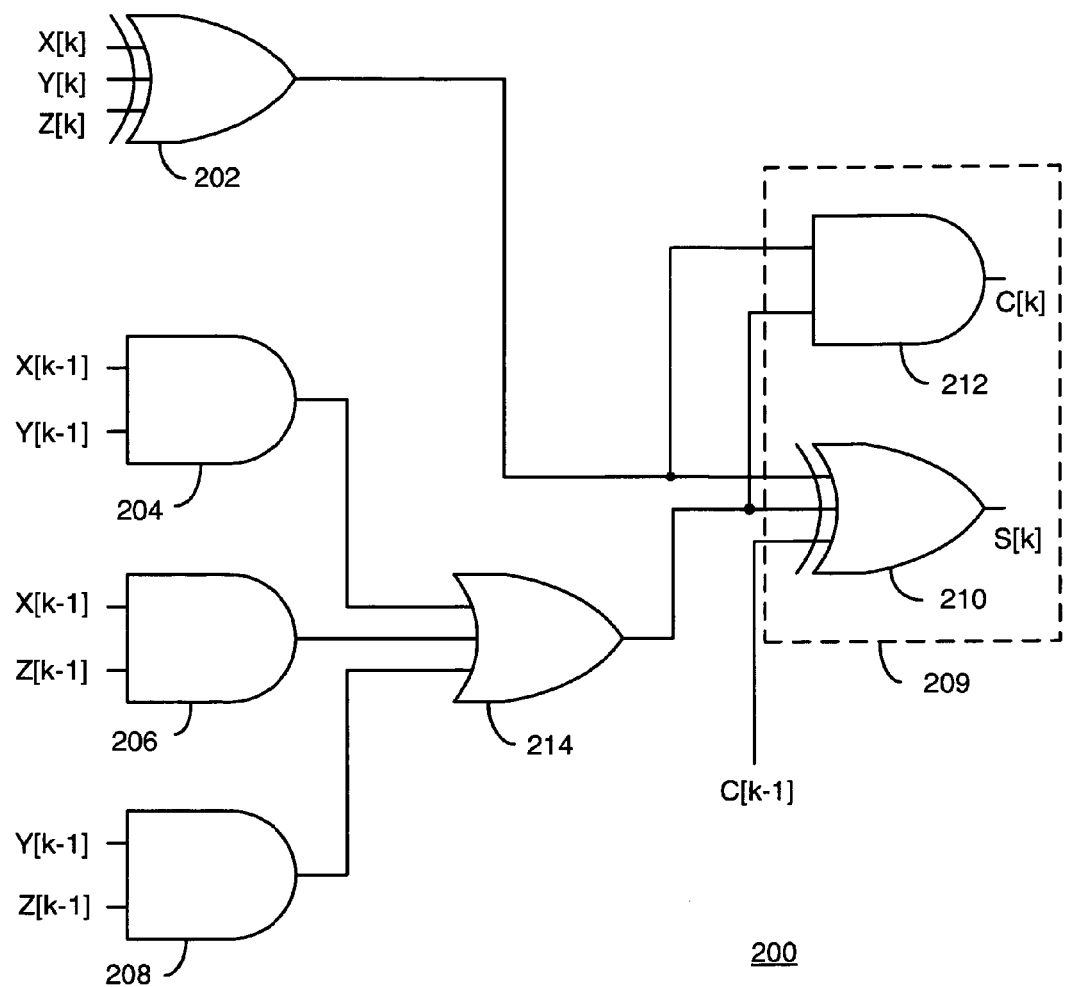
FIG. 2 is a block diagram depicting an nth stage of a conventional carry-save adder for the nth bit location of three input words.

Moreover, the adder stage of this embodiment of the present invention utilizes less logic resources in an FPGA than does the conventional carry-save adder shown in FIG. 2. While a stage of this embodiment of the invention only requires two function generators, a carry multiplexer, and an XOR gate, the carry-save adder of FIG. 2 requires three separate function generators. In an FGPA where an LB slice only includes two function generators, the carry-save adder requires significantly more FPGA resources (e.g., LBs) than does the adder of this embodiment of the present invention.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

What we claim:

1. A digital logic circuit, comprising:
   at least one stage, each stage of said at least one stage including:
   sum logic configured to generate a first sum signal from a first set of three input signals that includes a bit from each of three words;
   combinatorial logic having a carry generation portion configured to generate a first carry signal from a second set of three input signals and a sum generation portion configured to generate a second sum signal from said first sum signal and said first carry signal, said second set of three input signals including a less significant bit from each word of said three words than said first set of three input signals; and
   carry chain logic configured to process said first sum signal, said second sum signal, and a carry-in signal to generate a carry-out signal and a third sum signal,
   wherein said carry generation portion of said combinatorial logic comprises:
   a first AND gate having a first pair of input terminals configured to receive a first pair of signals in said second set of three input signals and a first output terminal;
   a second AND gate having a second pair of input terminals configured to receive a second pair of signals in said second set of three input signals and a second output terminal;
   a third AND gate having a third pair of input terminals configured to receive a third pair of signals in said second set of three input signals and a third output terminal; and
   an OR gate having three input terminals respectively coupled to said first output terminal, said second output terminal, and said third output terminal, said OR gate including a fourth output terminal for providing said first carry signal.

2. The digital logic circuit of claim 1, wherein said at least one stage includes a plurality of stages for processing said three words.

3. The digital logic circuit of claim 1, wherein said sum logic comprises an exclusive OR (XOR) gate having three input terminals configured to respectively receive said three input signals in said first set, and an output terminal configured to provide said first sum signal.

4. The digital logic circuit of claim 1, wherein said sum generation portion of said combinatorial logic comprises:
   an exclusive OR (XOR) gate having two input terminals configured to respectively receive said first carry signal and said first sum signal, and an output terminal configured to provide said second sum signal.

5. The digital logic circuit of claim 1, wherein said combinatorial logic comprises a first portion of programmable logic in a programmable logic device.

6. The digital logic circuit of claim 5, wherein said sum logic comprises an exclusive OR (XOR) gate having three input terminals configured to respectively receive said three input signals in said first set, and an output terminal configured to provide said first sum signal, and wherein said sum logic further comprises a second portion of programmable logic in said programmable logic device.

7. The digital logic circuit of claim 6, wherein said programmable logic device comprises a field programmable gate array, and said programmable logic comprises at least one logic block.

8. The digital logic circuit of claim 1, wherein said carry chain logic comprises:
  a multiplexer having a control terminal configured to receive said second sum signal, a first multiplexer input terminal configured to receive said first sum signal, and a second multiplexer input terminal configured to receive said carry-in signal, and a multiplexer output terminal configured to provide said carry-out signal; and
  an exclusive-OR (XOR) gate having a first input terminal configured to receive said carry-in signal, a second input terminal configured to receive said second sum signal, and an output terminal configured to provide said third sum signal.

9. An integrated circuit, comprising:
  programmable logic configured to provide at least one stage, said programmable logic including, for each stage in said at least one stage: a first function generator configured to generate a first sum signal from a first set of three input signals that includes a bit from each of three words;
  a second function generator configured to generate a first carry signal from a second set of three input signals and a second sum signal from said first sum signal and said first carry signal said second set of three input signals including a less significant bit from each word of said three words than said first set of three input signals; and
  carry chain logic configured to process said first sum signal, said second sum signal, and a carry-in signal to generate a carry-out signal and a third sum signal,
  wherein said second function generator is programmed to implement said carry generation operation by implementing a first AND operation with a first pair of signals in said second set of three input signals a second AND operation with a second pair of signals in said second set of three input signals, a third AND operation with a third pair of signals in said second set of three input signals, and an OR operation with output from each of said first AND operation said second AND operation, and said third AND operation to provide said first carry signal.

10. The integrated circuit of claim 9, wherein said at least one stage includes a plurality of stages for processing said three words.

11. The integrated circuit of claim 10, wherein said first function generator is programmed to implement an exclusive OR (XOR) operation with said three input signals in said first set to provide said first sum signal.

12. The integrated circuit of claim 10, wherein said second function generator is programmed to implement a carry generation operation to generate said first carry signal, and an exclusive OR (XOR) operation with said first carry signal and said first sum signal to provide said second sum signal.

13. The integrated circuit of claim 10, wherein said carry chain logic comprises: a multiplexer having a control terminal configured to receive said second sum signal, a first multiplexer input terminal configured to receive said first sum signal, and a second multiplexer input terminal configured to receive said carry-in signal, and a multiplexer output terminal configured to provide said carry-out signal; and an exclusive-OR (XOR) gate having a first input terminal configured to receive said carry-in signal, a second input terminal configured to receive said second sum signal, and an output terminal configured to provide said third sum signal.

14. The integrated circuit of claim 9, wherein said programmable logic comprises at least one logic block of a field programmable gate array.

15. The integrated circuit of claim 14, wherein each of said first function generator and said second function generator comprises a look-up table (LUT).

16. A method, comprising:
  configuring a first function generator in an integrated circuit to generate a first sum signal from a first set of three input signals that includes a bit from each of three words;
  configuring a second function generator in said integrated circuit to generate a first carry signal from a second set of three input signals and a second sum signal from said first sum signal and said first carry signal, said second set of three input signals including a less significant bit from each word of said three words than said first set of three input signals; and
  configuring carry chain logic in said integrated circuit to process said first sum signal, said second sum signal, and a carry-in signal to generate a carry-out signal and a third sum signal,
  wherein said second function generator is programmed to implement said carry generation operation by implementing a first AND operation with a first pair of signals in said second set of three input signals a second AND operation with a second pair of signals in said second set of three input signals, a third AND operation with a third pair of signals in said second set of three input signals, and an OR operation with output from each of said first AND operation, said second AND operation, and said third AND operation to provide said first carry signal.

17. The method of claim 16, wherein said integrated circuit comprises a field programmable gate array.

18. The method of claim 17, wherein each of said first function generator and said second function generator comprises a look-up table (LUT).

* * * * *

UNITED STATES PATENT AND TRADEMARK OFFICE
CERTIFICATE OF CORRECTION

| | | |
|---|---|---|
| PATENT NO. | : 7,653,677 B1 | Page 1 of 1 |
| APPLICATION NO. | : 11/044744 | |
| DATED | : January 26, 2010 | |
| INVENTOR(S) | : Campbell et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1401 days.

Signed and Sealed this

Twenty-third Day of November, 2010

David J. Kappos
*Director of the United States Patent and Trademark Office*